(12) United States Patent
Hayashi et al.

(10) Patent No.: US 7,668,448 B2
(45) Date of Patent: Feb. 23, 2010

(54) FLASH APPARATUS AND IMAGING APPARATUS

(75) Inventors: Haruo Hayashi, Chiba (JP); Yasuyuki Seki, Saitama (JP); Katsuhiro Sugiyama, Chiba (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 11/508,296

(22) Filed: Aug. 23, 2006

(65) Prior Publication Data
US 2007/0047944 A1 Mar. 1, 2007

(30) Foreign Application Priority Data
Aug. 29, 2005 (JP) ............................. 2005-248146

(51) Int. Cl.
*G03B 15/03* (2006.01)
(52) U.S. Cl. .................... 396/62; 396/155; 396/174; 396/175
(58) Field of Classification Search ............... 396/62, 396/155, 174, 175; 362/3, 16–18
See application file for complete search history.

(56) References Cited

U.S. PATENT DOCUMENTS

| | | | | |
|---|---|---|---|---|
| 4,078,240 A | * | 3/1978 | Kaneko et al. ............... | 396/159 |
| 4,238,150 A | * | 12/1980 | Quinn ......................... | 396/174 |
| 4,512,644 A | * | 4/1985 | Yoshida ....................... | 396/174 |
| 4,603,953 A | * | 8/1986 | Watanabe .................... | 396/201 |
| 5,839,006 A | * | 11/1998 | Beckerman .................. | 396/174 |
| 5,911,085 A | * | 6/1999 | Fuke et al. ..................... | 396/62 |
| 6,614,999 B2 | * | 9/2003 | Hagiuda et al. .............. | 396/155 |

FOREIGN PATENT DOCUMENTS

| JP | 62-076974 A | 4/1987 |
|---|---|---|
| JP | 11-174542 A | 7/1999 |

\* cited by examiner

*Primary Examiner*—W. B. Perkey
(74) *Attorney, Agent, or Firm*—Rader, Fishman & Grauer PLLC

(57) ABSTRACT

A flash apparatus is provided. The flash apparatus includes: an attachment portion capable of being attached in a freely detachable manner to an attachment target portion provided on an imaging apparatus; a main body supported in a turnable manner in an anteroposterior direction with respect to the attachment portion by means of a first turning portion; and a light-emitting portion supported in a turnable manner in an anteroposterior or vertical direction with respect to the main body by means of a second turning portion, including a light emitter directly or indirectly emitting light to a subject.

5 Claims, 10 Drawing Sheets

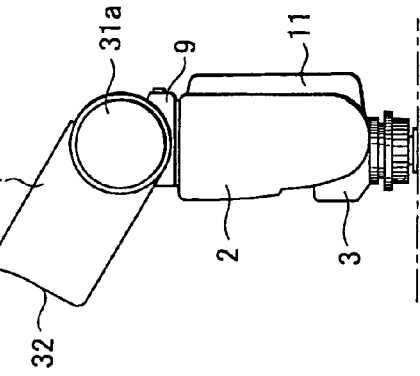
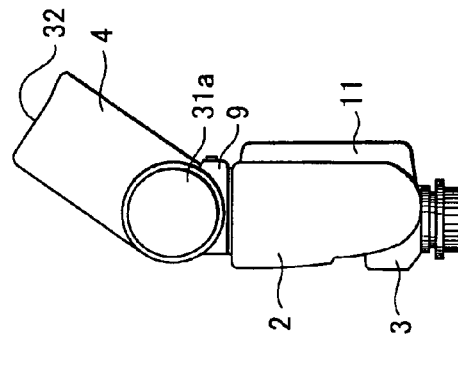
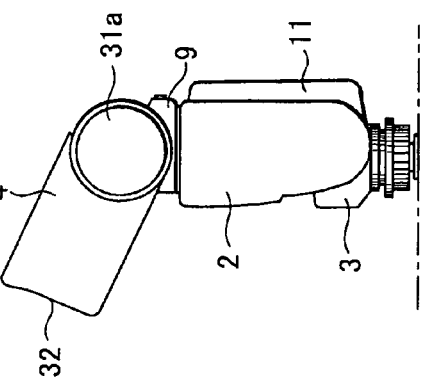
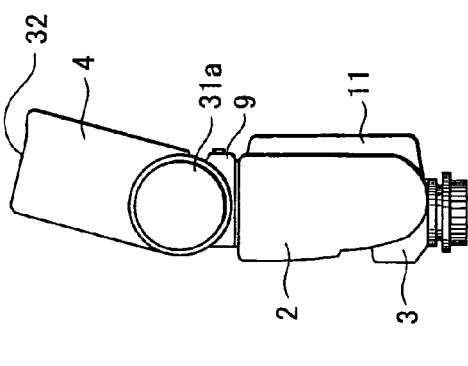
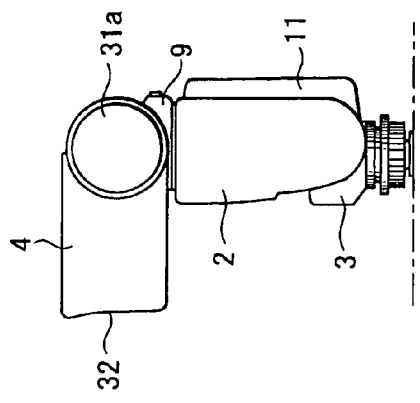
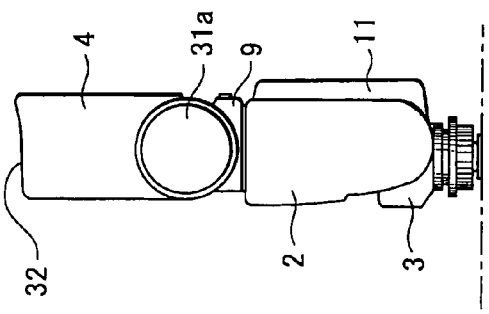

FLASH APPARATUS AND IMAGING APPARATUS

CROSS REFERENCES TO RELATED APPLICATIONS

The present invention contains subject manner related to Japanese Patent Application JP 2005-248146 filed in the Japanese Patent Office on Aug. 29, 2005, the entire contents of which being incorporated herein by reference.

BACKGROUND OF THE INVENTION

1. Field of the Invention

The present invention relates to a flash apparatus in which a light-emitting portion and a main body are joined, with the main body and an attachment portion being joined, both in a turnable manner by means of turning portions, so light can be emitted with the light-emitting portion being directed in an arbitrary direction. The present invention also relates to an imaging apparatus to which the flash apparatus is attached in a freely detachable manner.

2. Description of the Related Art

Japanese Published Patent Application No. 11-174542, for example, discloses a flash apparatus of related art used in an electronic still camera or the like. An external stroboscopic apparatus capable of being freely attached to and detached from a camera is described in this patent document. This stroboscopic apparatus is capable of being attached to and detached from a camera, and it includes a stroboscopic zoom drive circuit, an imager and an imaging lens system. The stroboscopic zoom drive circuit modifies a stroboscopic irradiation angle in response to a signal from the camera. The imager picks up an image of a subject with an electronic imaging device and converts it to an electronic image. The imaging lens system forms an image of luminous flux of a subject in the electronic imaging device and modifies a focal length in relation to a modification of a stroboscopic irradiation angle by the stroboscopic zoom drive circuit.

According to the stroboscopic apparatus described in the above-described patent document having such structure, it is expected that an image that has been photographed can be checked, with a camera being not enlarged, and thus not impairing portability.

Further, Japanese Published Patent Application No. 62-76974, for example, discloses another flash apparatus of the related art. A video camera with an illuminating light is described in this patent document. This video camera with the illuminating light includes an illuminating light using a battery, which is provided close to an imaging lens. An angle $\alpha$ formed by an optical axis of the illuminating light and the optical axis of the imaging lens is set to satisfy $\alpha=(\theta_2-\theta)/2$ provided that $\theta_2=\tan^{-1}(a/S_0+\tan\theta)$, where $\theta$ is ½ the view angle of the lens, a is the space between the lens and the illuminating light and $S_0$ is the closest distance. Further, $\beta$ which is the irradiation angle of the illuminating light, is set to satisfy $\theta+\theta_2 \leq \beta \leq \theta_2$.

According to a video camera with an illuminating light having such structure, it is expected that a battery-driven illuminating light which is low in power consumption and is small in light quantity can be used in a video camera because of a favorable irradiation efficiency.

However, regarding the stroboscopic apparatus in the above-described Japanese Published Patent Application No. 11-174542, a turning portion for shifting the position of a Fresnel lens, which is a light emitting part, to an arbitrary position is not provided. Therefore, the position of a Fresnel lens is fixed to face a subject. Hence, in the case where a lens device of an imaging apparatus using this stroboscopic apparatus greatly protrudes toward a subject due to, for example, a zoom lens, conversion lens or the like, an inconvenience may occur. Namely, if flash photography is carried out with the lens device close to the subject, part of light emitted from the stroboscopic apparatus is obstructed by the lens device, and so part of a photographed image is dimmed to cause what is called an eclipse. Moreover, only the photography of directly irradiating a subject with light can be carried out, and therefore what is called bounce photography in which light is emitted toward a wall, ceiling or the like and then a subject is irradiated with the reflected light, may not be carried out.

Also, regarding the video camera with the illuminating light in the above-described Japanese Published Patent Application No. 62-76974, an illuminating light is provided in the vicinity of a lens device of a video camera of a fixed focus type in which a view angle may not change. The angle of light emitted from the illuminating light is set at a predetermined angle, so that unnecessary irradiation, a deficiency in irradiation range and the like with respect to a photographed image are prevented. Thus, there is a problem that it is difficult to change the emission angle of the illuminating light when photography is carried out with a view angle that is altered, such as the case of zoom photography. Further, since the illuminating light is fixed facing a subject, it is difficult to carry out bounce photography similarly to the case of the stroboscopic apparatus in the above-described Japanese Published Patent Application No. 11-174542.

SUMMARY OF THE INVENTION

It is desirable to prevent an eclipse occurring in a related-art flash apparatus that is being attached to an imaging apparatus which has a lens device greatly protruding toward a subject. In the related art, if photography is carried out with the lens device close to the subject, part of light emitted from the flash apparatus is obstructed by the lens device, thereby causing an eclipse in a photographed image.

A flash apparatus according to an embodiment of the present invention includes an attachment portion, a main body and a light-emitting portion. The attachment portion can be attached in a freely detachable manner to an attachment target portion provided on an imaging apparatus. The main body is supported in a turnable manner in an anteroposterior direction with respect to the attachment portion by means of a first turning portion. The light-emitting portion is supported in a turnable manner in an anteroposterior or vertical direction with respect to the main body by means of a second turning portion and has a light emitter that directly or indirectly emits light to a subject.

Further, an imaging apparatus according to an embodiment of the present invention includes a lens device, an imager, a flash apparatus and an attachment target portion. Light reflected from a subject is passed through the lens device. The imager picks up a subject image input from the lens device and outputs an image signal thereof. The flash apparatus directly or indirectly emits light to the subject. The flash apparatus is attached to the attachment target portion in a detachable manner. The flash apparatus includes an attachment portion, a main body and a light-emitting portion. The attachment portion can be attached in a freely detachable manner to an attachment target portion. The main body is supported in a turnable manner in an anteroposterior direction with respect to the attachment portion by means of a first turning portion. The light-emitting portion is supported in a turnable manner in an anteroposterior or vertical direction with respect to the main body by means of a second turning portion and has a light emitter facing a subject.

According to an embodiment of a flash apparatus of the present invention, a main body is turned so as to be tilted toward a subject, causing the position of a light-emitting portion to be shifted in the vicinity of a lens device of an imaging apparatus in which the flash apparatus is attached. Even if the lens device greatly protrudes toward the subject, part of the light emitted from the light-emitting portion is not obscured by the lens device, thereby making it possible to prevent an eclipse which occurs in a photographed image.

BRIEF DESCRIPTION OF THE DRAWINGS

FIGS. 9A through 9F show the turns of a light-emitting portion when a main body of the flash apparatus shown in FIG. 1 stands virtually upright with respect to an attachment portion, in which FIG. 9A shows a state of the light-emitting portion facing in a horizontal direction, FIG. 9B shows a state of that portion facing upward by approximately 25°, FIG. 9C shows a state of that portion facing upward by approximately 30°, FIG. 9D shows a state of that portion facing virtually vertically upward, FIG. 9E is a state of that portion being tilted backward by 15 or so from FIG. 9D, and FIG. 9F is a state of that portion being tilted further backward by 5° or so from FIG. 9E;

FIGS. 10A through 10F show the turns of a light-emitting portion when a main body of the flash apparatus shown in FIG. 1 has been tilted forward by approximately 30°, in which FIG. 10A is a state of the light-emitting portion facing downward by approximately 30° with respect to a horizontal direction, FIG. 10B is a state of the light-emitting portion facing downward by approximately 5° with respect to a horizontal direction, FIG. 10C is a state of the light-emitting portion facing in a horizontal direction, FIG. 10D is a state of the light-emitting portion being tilted upward by approximately 60° with respect to a horizontal direction (state of standing virtually upright on the main body), FIG. 10E is a state of the light-emitting portion being tilted further upward by 15° or so from that in FIG. 10D, and FIG. 10F is a state of the light-emitting portion facing virtually vertically upward;

DESCRIPTION OF THE PREFERRED EMBODIMENTS

There is provided a flash apparatus including: an attachment portion capable of being attached to an attachment target portion provided on an imaging apparatus, a main body supported in a turnable manner in an anteroposterior direction with respect to the attachment portion and a light-emitting portion supported in a turnable manner in an anteroposterior or vertical direction with respect to the main body, including a light emitter. Thus, a flash apparatus is obtained with a simplified structure in which an eclipse occurring in a photographed image is prevented, and when bounce photography is carried out, the direction of light emitted from the light-emitting portion can be set in a desired direction.

Figure 1:
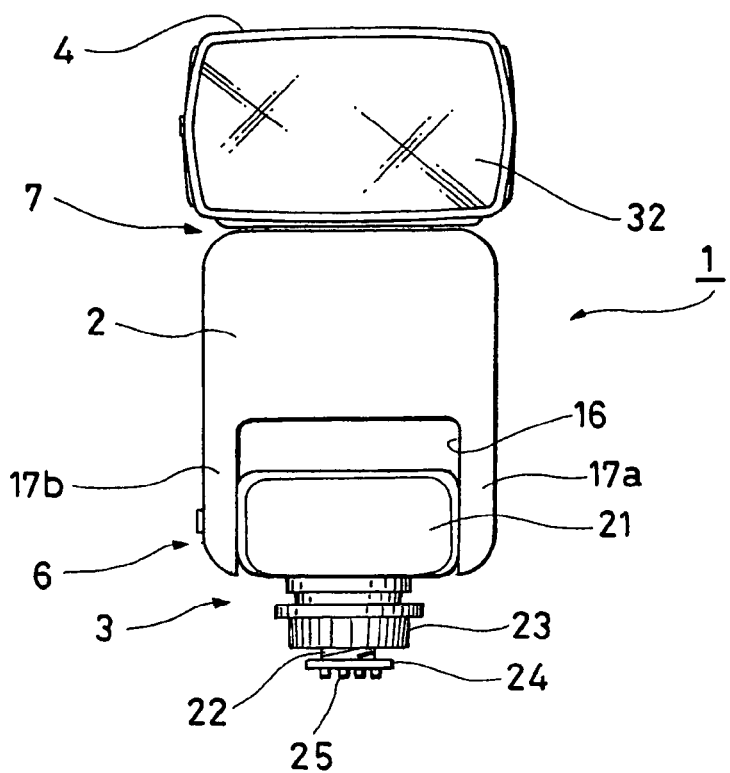
FIG. 1 is a front view showing a flash apparatus according to an embodiment of the present invention.
Figure 2:
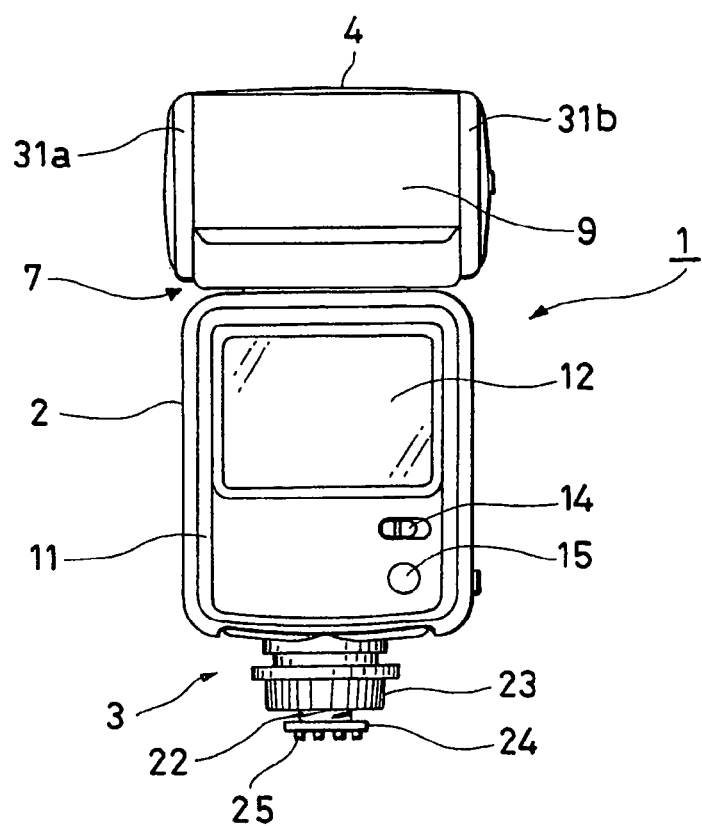
FIG. 2 is a rear view of the flash apparatus shown in FIG. 1.
Figure 3:
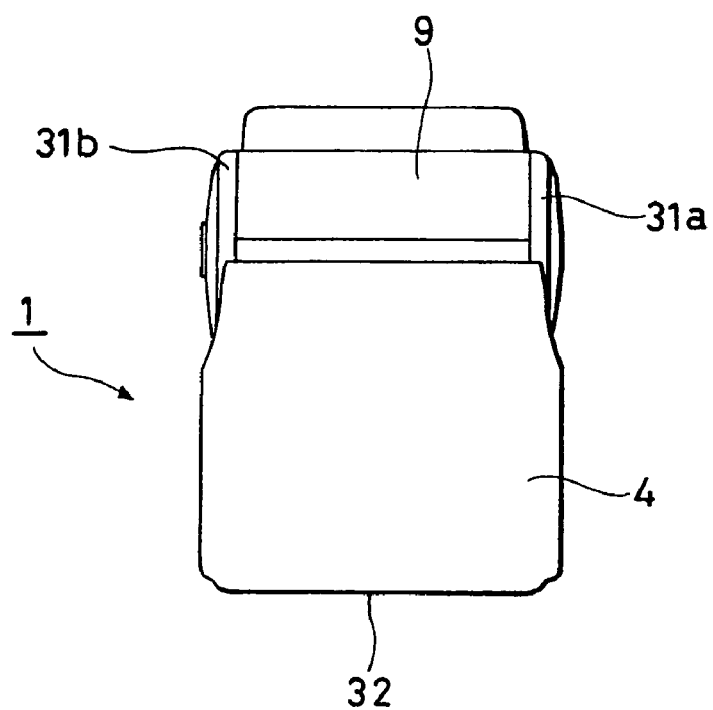
FIG. 3 is a plan view of the flash apparatus shown in FIG. 1.
Figure 4:
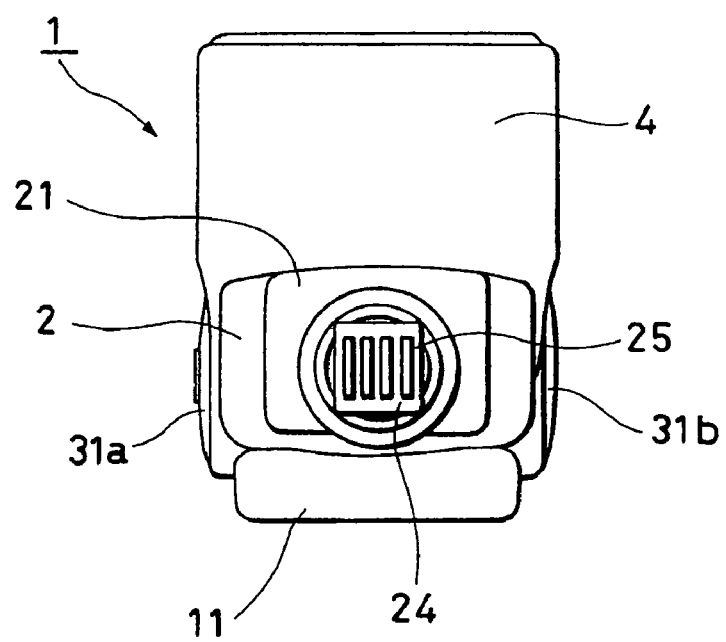
FIG. 4 is a bottom view of the flash apparatus shown in FIG. 1.
Figure 5:
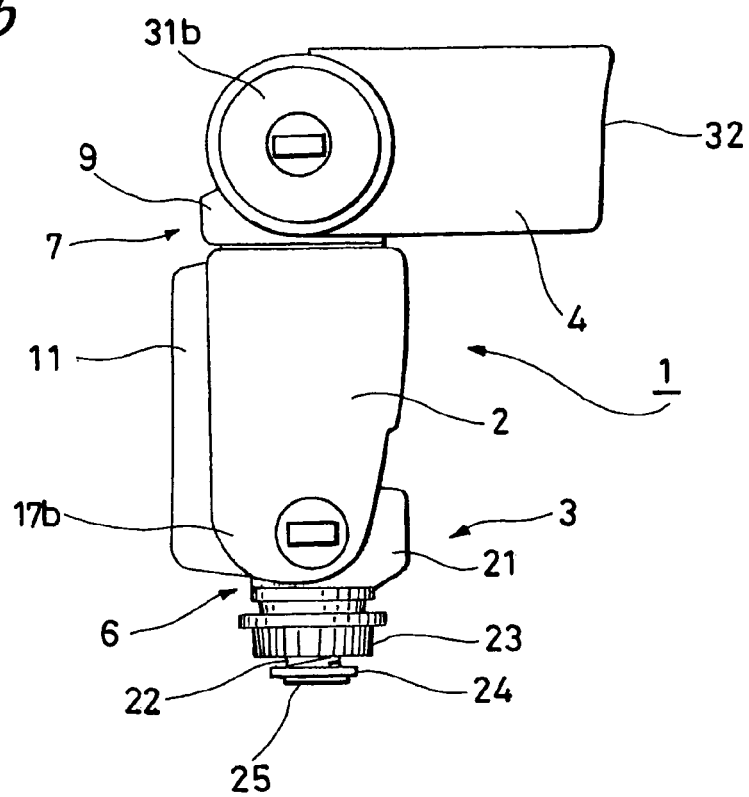
FIG. 5 is a left side elevational view of the flash apparatus shown in FIG. 1.
Figure 6:
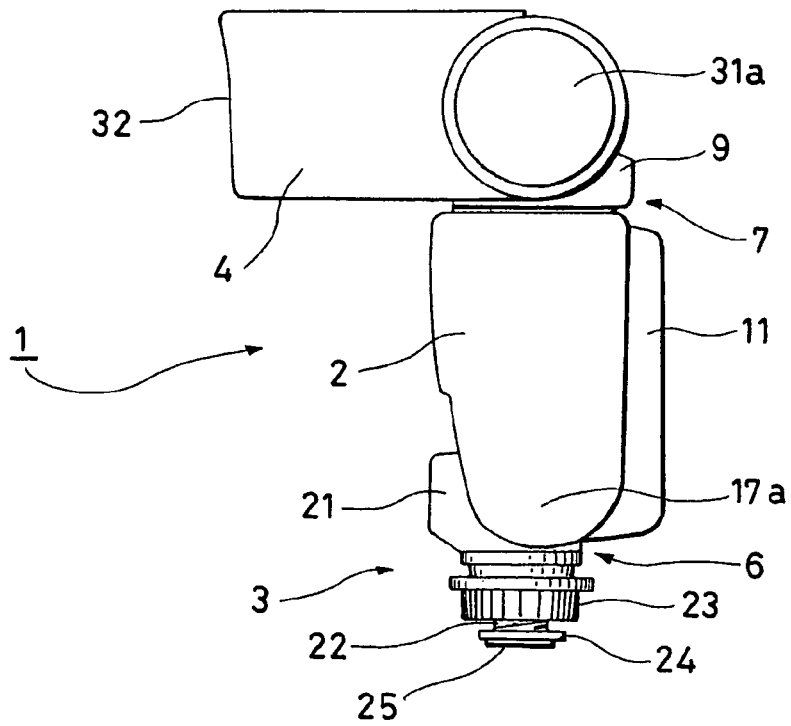
FIG. 6 is a right side elevational view of the flash apparatus shown in FIG. 1.
Figure 7:
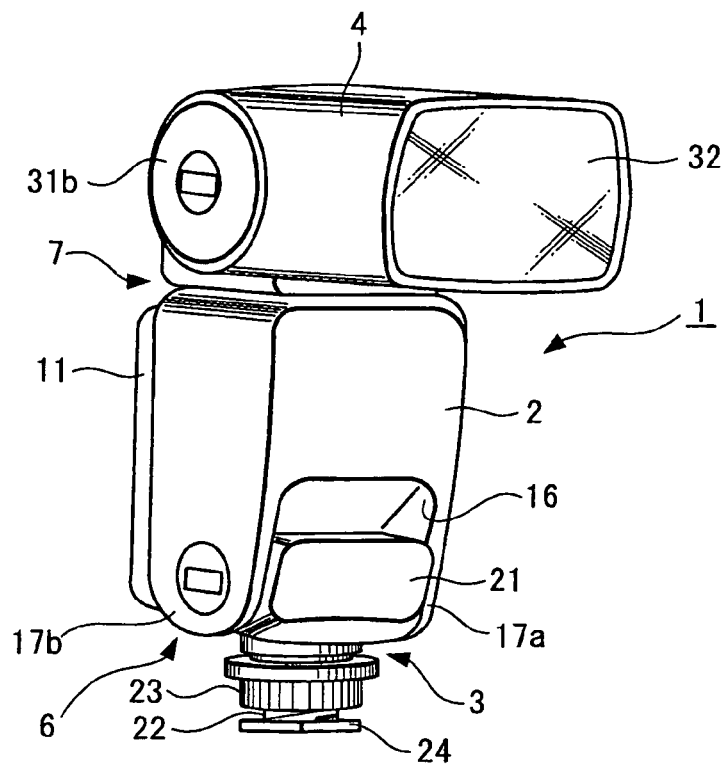
FIG. 7 is an external perspective view of the flash apparatus shown in FIG. 1, as seen from the front side at an oblique angle.
Figure 8:
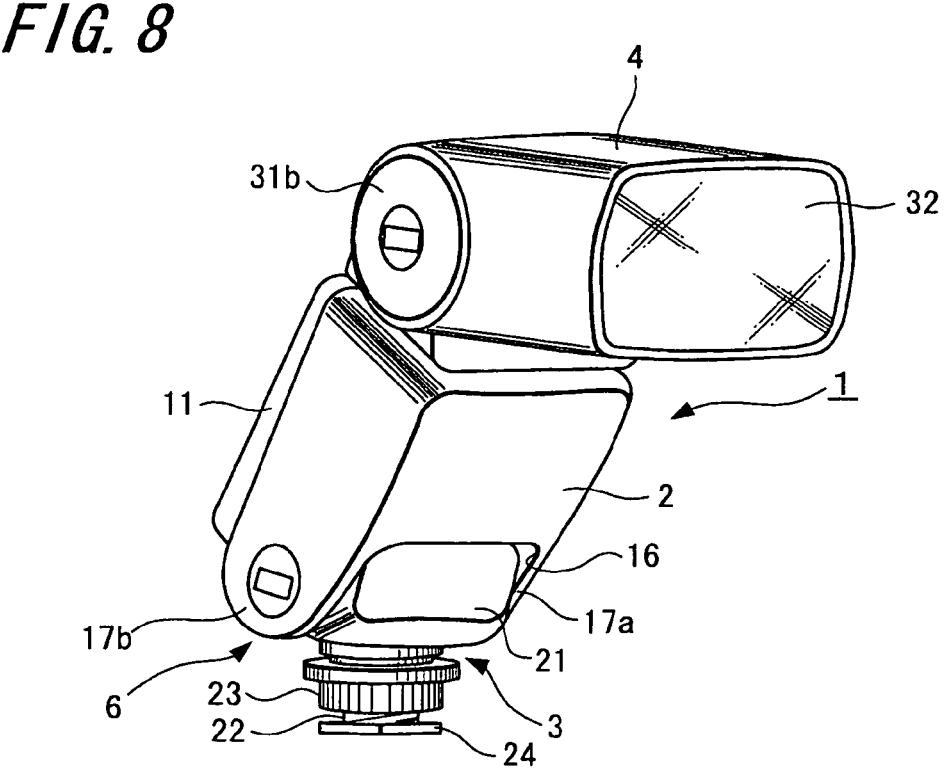
FIG. 8 is a perspective view showing a state in which a main body of the flash apparatus shown in FIG. 1 is tilted forward and a light-emitting surface of a light-emitting portion faces forward.
Figure 10A:
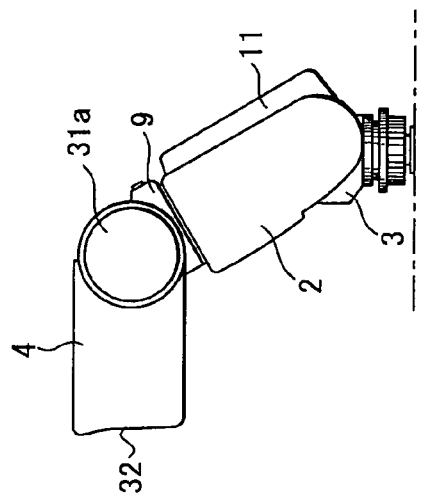
Figure 10B:
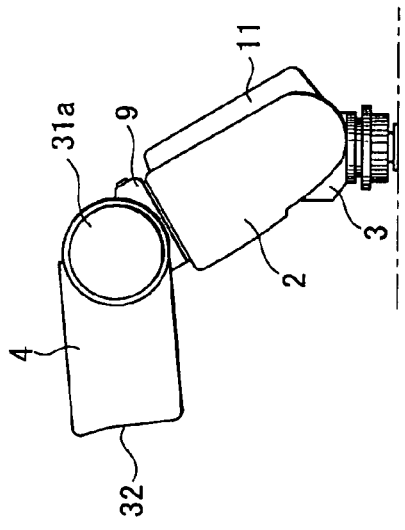
Figure 10C:
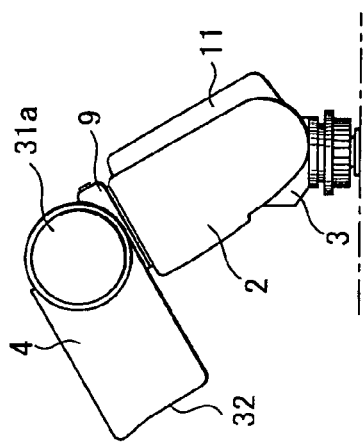
Figure 10D:
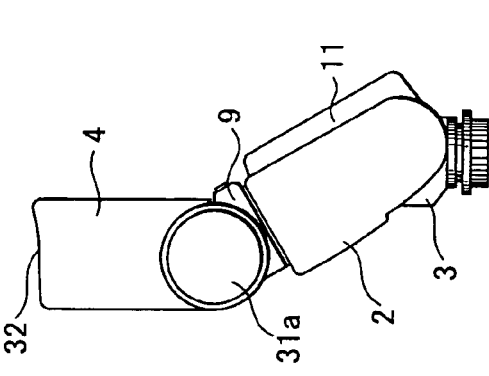
Figure 10E:
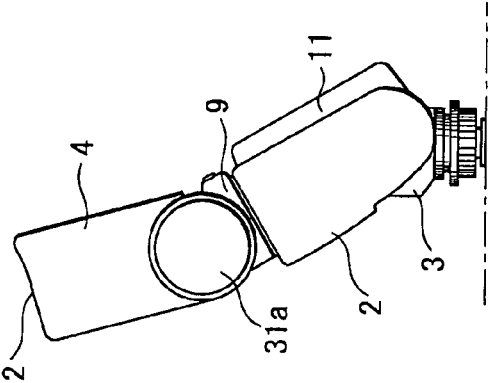
Figure 10F:
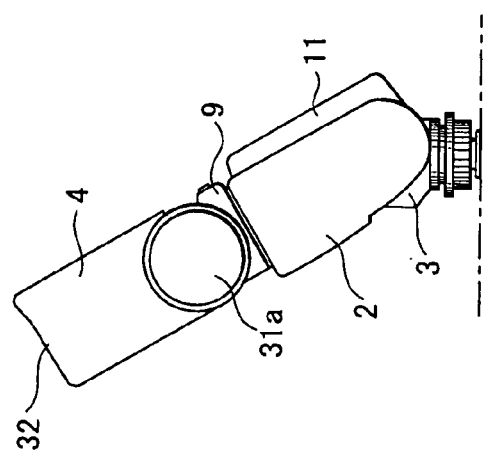
Figure 11:
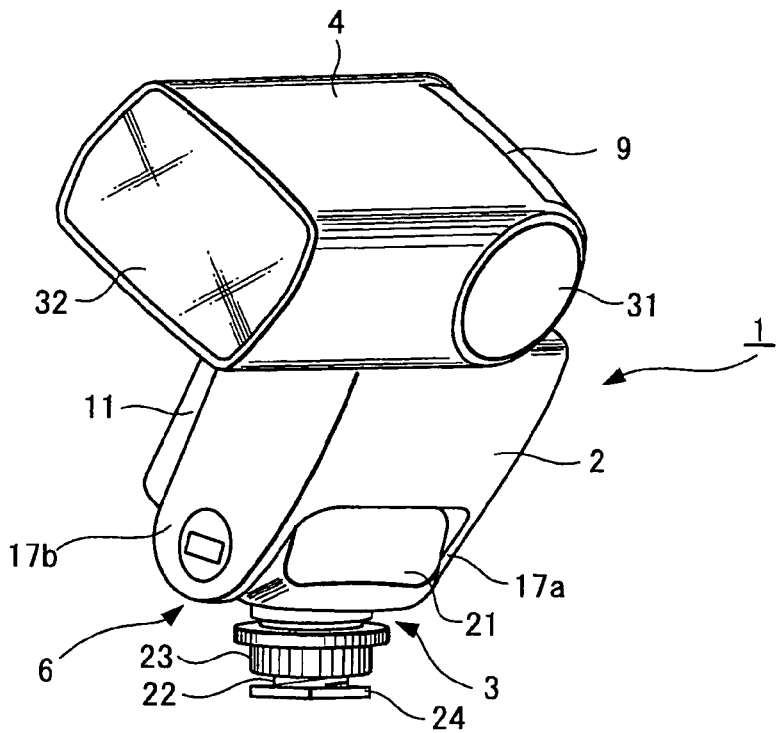
FIG. 11 is a perspective view showing a state in which a main body of the flash apparatus shown in FIG. 1 is tilted forward and a light-emitting surface of a light-emitting portion faces sideward (facing the left side of the flash apparatus)
Figure 12:
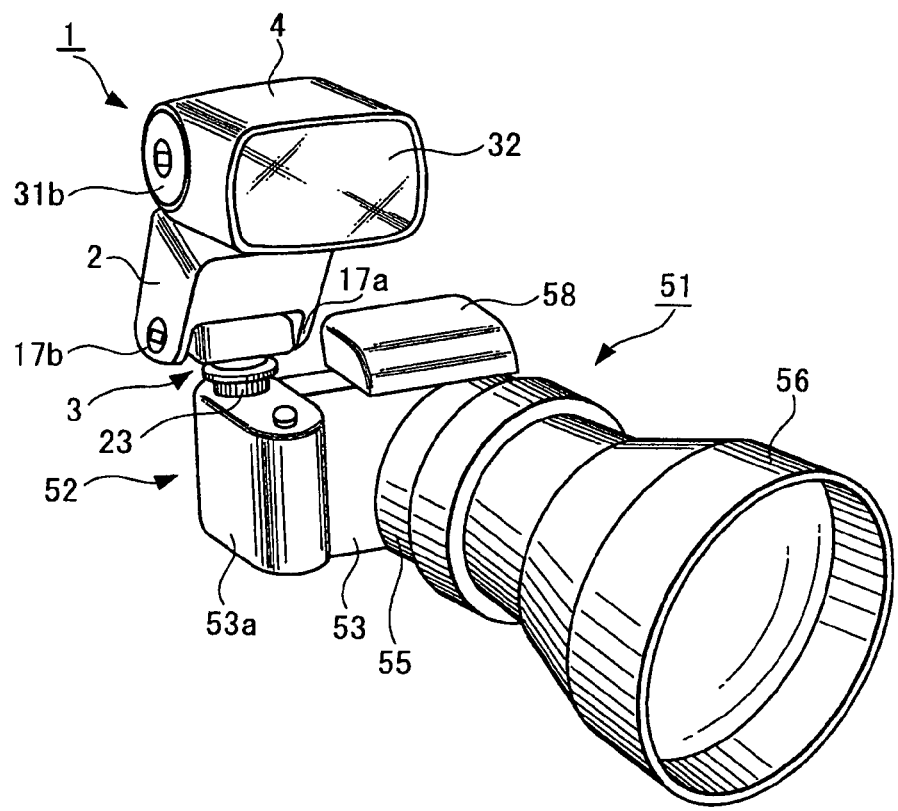
FIG. 12 is a perspective view showing a state in which the flash apparatus shown in FIG. 1 has been attached to an imaging apparatus according to an embodiment of the present invention.
Figures 13A, 13B:
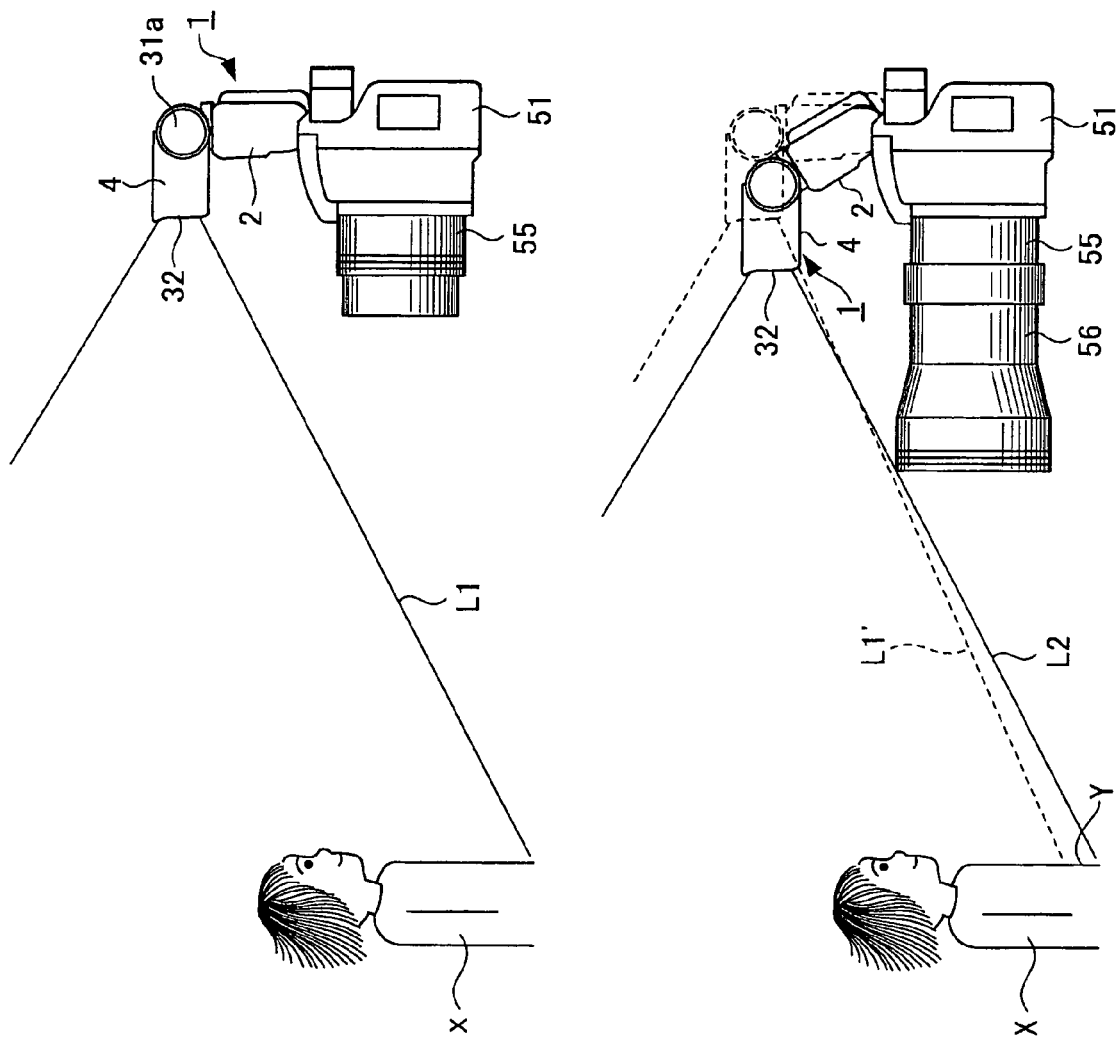
FIGS. 13A and 13B are explanatory diagrams showing states in which flash photography is carried out with the flash apparatus shown in FIG. 1 being attached to an imaging apparatus according to an embodiment of the present invention.
Figure 14:
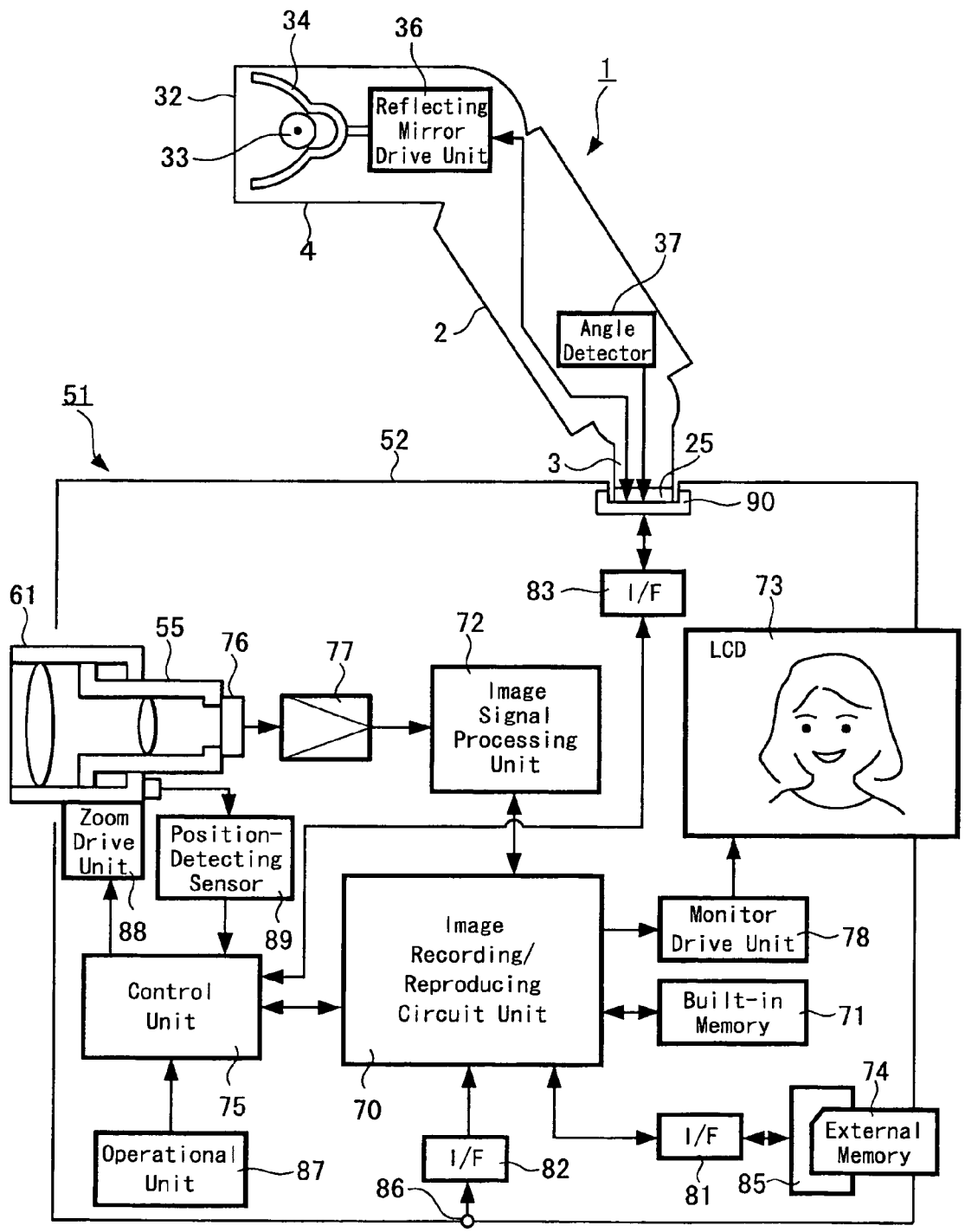
FIG. 14 is a block diagram showing a schematic configuration of a flash apparatus and an imaging apparatus according to an embodiment of the present invention.
Figure 15:
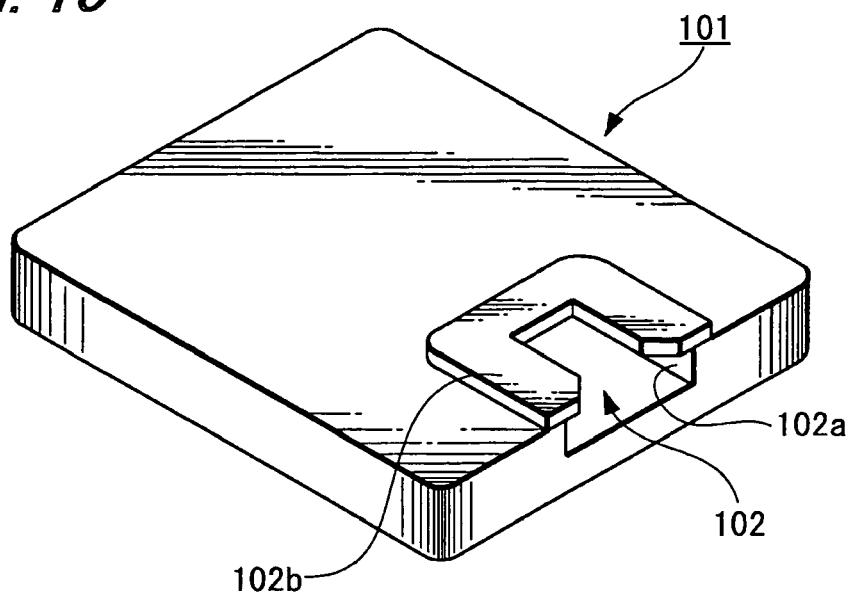
FIG. 15 is a perspective view of a stand attached to a flash apparatus according to an embodiment of the present invention.
Figure 16:
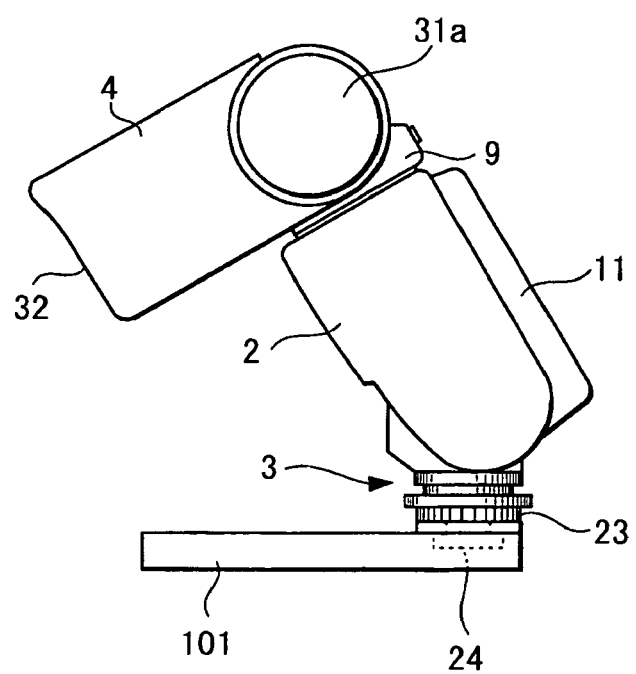
FIG. 16 is an explanatory diagram showing a state in which the stand shown in FIG. 15 has been attached to a flash apparatus according to an embodiment of the present invention.

An embodiment of the present invention will be explained by referring to the attached drawings. FIGS. 1 to 16 are for explaining embodiments of the present invention. Specifically, FIGS. 1 to 7 show a first embodiment of a flash apparatus according to the present invention: FIG. 1 is a front view, FIG. 2 is a rear view; FIG. 3 is a plan view; FIG. 4 is a bottom view; FIG. 5 is a left side elevational view; FIG. 6 is a right side elevational view; and FIG. 7 is an external perspective view. FIG. 8 is a perspective view showing a first example of a posture of a flash apparatus according to an embodiment of the present invention. FIGS. 9A to 9F are explanatory diagrams showing the turns of a light-emitting portion in a state in which a main body stands upright with respect to an attachment portion. FIGS. 10A to 10F are explanatory diagrams showing the turns of a light-emitting portion in a state in which a main body has been tilted forward. FIG. 11 is a perspective view showing a second example of a posture of a flash apparatus according to an embodiment of the present invention. FIG. 12 is a perspective view showing an imaging apparatus according to a first embodiment of the present invention in which a flash apparatus according to an embodiment of the present invention has been attached. FIGS. 13A and 13B are explanatory diagrams each showing the irradiation range of a flash apparatus according to an embodiment of the present invention. FIG. 14 is a block diagram showing a schematic configuration of a flash apparatus and imaging apparatus according to an embodiment of the present invention. FIG. 15 is a perspective view of a supporting stand attached to a flash apparatus according to an embodiment of the present invention. FIG. 16 is an explanatory diagram showing a state in which the supporting stand in FIG. 15 has been attached.

A flash apparatus 1 shown in FIGS. 1 to 7 includes a main body 2, an attachment portion 3 and a light-emitting portion 4. The main body 2 and the attachment portion 3 are joined together in a turnable manner in an anteroposterior direction (or vertical direction) by means of a first turning portion 6. The main body 2 and the light-emitting portion 4 are joined together in a turnable manner in a horizontal direction and an anteroposterior direction (or vertical direction) by means of a second turning portion 7.

The first turning portion 6 includes, for example, a lower bearing portion of the main body 2, a bearing portion of the attachment portion 3 and a first turning shaft which penetrates through both the bearing portions in a horizontal direction. The first turning portion 6 is capable of turning in an anteroposterior direction (or vertical direction) with the first turning shaft being the turning center. Also, on the first turning shaft, a spring member (for example, a disk spring, coil a spring or the like) which generates friction resistance is interposed between the main body 2 and the attachment portion 3, and by means of the spring force of the spring member, the main body 2 can be held at an arbitrary tilted angle with respect to the attachment portion 3.

The second turning portion 7 includes a horizontal turning portion which turns the light-emitting portion 4 in a horizontal direction and a vertical turning portion which turns the light-emitting portion 4 in a vertical direction (anteroposterior direction). The horizontal turning portion includes an upper turning shaft portion provided on the top of the main body 2 and a horizontal movement shaft portion which is provided on a joint member 9 interposed between the main body 2 and the light-emitting portion 4 and which penetrates through the aforementioned upper turning shaft portion in a vertical direction. Therefore, the light-emitting portion 4 is capable of turning in a horizontal direction with the upper turning shaft portion being the turning center. It should be appreciated that a bearing hole may be provided in the main body 2 and a turning shaft portion may be provided on the joint member 9, enabling a turn in a horizontal direction.

Further, the vertical turning portion includes a vertical movement bearing portion provided on the joint member 9, a turning shaft portion on the light-emitting portion 4 and a second turning shaft which penetrates through both the vertical movement bearing portion and the turning shaft portion in a horizontal direction. Therefore, the vertical turning portion is capable of turning in an anteroposterior direction (vertical direction) with the second turning shaft being the turning center. Since the second turning portion 7 includes the horizontal turning portion and the vertical turning portion, the light-emitting portion 4 is capable of turning relatively both in a horizontal direction and an anteroposterior direction with respect to the main body 2. As a result, a light-emitting surface of the light-emitting portion 4 on the side opposite to the second turning portion can roughly be moved spherically in the form of a hemisphere.

The main body 2 of the flash apparatus 1 includes a casing roughly shaped like a rectangular parallelepiped, with a space provided inside storing a wiring substrate on which various electronic parts are mounted, a battery power source, various electronic and mechanical parts and the like, although they are not shown in the figures.

On the rear surface of the main body 2, an expanded portion 11 which protrudes roughly in the form of a square, is provided. As shown in FIG. 2, a display panel 12 formed of a liquid crystal display (LCD) or the like displaying the distance to a subject, a zoom magnification and the like is provided at the upper part of the expanded portion 11. A mode selector switch 14, a power button 15, other operational buttons (not shown in the figure) and the like are provided below the display panel 12. The mode selector switch 14 switches functions of the flash apparatus 1. With respect to the function modes, a synchronization mode in which light is emitted from the light-emitting portion 4 when a shutter button on an imaging apparatus attached is pressed, a slave mode in which light is emitted from the light-emitting portion 4 in synchronization with light emitted from another flash apparatus, such as that provided on a camera body and so forth can be mentioned, for example.

A roughly square recess 16 is provided at the lower end of the main body 2 from the lower surface to the front surface, and a pair of protruding pieces 17a and 17b are formed by providing the recess 16. Lower bearing portions constituting part of the first turning portion 6 are provided in the pair of protruding pieces 17a and 17b of the main body 2.

In this embodiment, the main body 2 is capable of turning as shown in FIGS. 9 and 10. Specifically, the turn of the main body 2 can be carried out in a vertical direction within the range of an angle of approximately 30° from a state in which the main body 2 stands virtually upright to face upward with respect to the attachment portion 3 (see FIGS. 9A to 9F and others) to a state in which the main body 2 is tilted toward the front side to face diagonally upward (see FIGS. 10A to 10F and others). Further, within this range, the main body 2 can be fixed to the attachment portion 3 in an arbitrary position.

The attachment portion 3 includes an attachment member 21 arranged inside the recess 16 of the main body 2, a fixing screw 22 fixed on the lower surface of the attachment member 21 in such a manner as to protrude downward, a disk-like fastening ring 23 fitted to the fixing screw 22, a fixing board 24 shaped like a flat board, fixed to the bottom of the fixing screw 22, and the like. Although not shown in the figures, a bearing hole constituting part of the first turning portion 6 is provided in the attachment member 21 of the attachment portion 3. This attachment portion 3 can be attached to an accessory shoe that is a specific example of an attachment target portion provided on an imaging apparatus or the like. Specifically, an upper surface piece of an accessory shoe is held by the fastening ring 23 and the fixing board 24, enabling the attachment portion 3 to be attached to the accessory shoe. Also, on the lower surface of the fixing board 24 of the attachment portion 3, a connecting terminal 25 for electrically connecting the flash apparatus 1 to an imaging apparatus is provided. The light-emitting portion 4 of the flash apparatus 1 is provided with a roughly rectangular frame whose front and rear surfaces have openings, and the opening portion in the rear surface is opposed to the joint member 9. On the rear side of both the side surfaces of the light-emitting portion 4, a pair of protruding pieces 31a and 31b protruding in a circular form is provided. The pair of protruding pieces 31a and 31b is provided with a turning shaft portion constituting part of the vertical turning portion of the second turning portion 7, although it is not shown in the figures.

As shown in FIG. 1 and others, a Fresnel lens 32 is attached to the opening portion at the front of the light-emitting portion 4. A light emitter is provided inside the light-emitting portion 4 behind the Fresnel lens 32. The light emitter includes a xenon tube 33 as a light source, a reflecting mirror 34 positioned behind the xenon tube 33 and the like. Light emitted from the light emitter including the xenon tube 33, the reflecting mirror 34 and the like is diffused by the Fresnel lens 32 and thus radiated to the outside of the light-emitting portion 4.

The xenon tube 33 is a cylindrical lamp sealed with high-pressure xenon gas, and it is fixed by a supporting member (not shown) provided on the inner surface of the light-emitting portion 4. Also, the reflecting mirror 34 is formed such that the section thereof becomes roughly elliptical with respect to an optical axis. The reflecting mirror 34A is caused to be movable in the direction close to or away from the xenon tube 33 by a reflecting-mirror drive unit 36 serving as an irradiation-range modifier. Thus, the emission angle of light emitted from the light emitter can be modified and the irradiation range of light with which a subject or the like is irradiated can be adjusted.

The reflecting-mirror drive unit 36 which moves the reflecting mirror 34 includes a motor, a gear fitted with a rotary shaft of this motor, a feed screw which engages with the gear and the like, for example. In this regard, a female screw portion which fits the feed screw is provided on the reflecting mirror 34, transmitting the rotation of the motor to the feed screw by means of the gear, and rotating the feed screw. Hence, the reflecting mirror 34 provided with the female screw portion can be moved relatively to the xenon tube 33 fixed and thus can be moved to a desired position.

In the present embodiment, the turn of the light-emitting portion 4 in a vertical direction is performed as shown in FIGS. 9A to 9F. The light-emitting portion 4 is capable of turning within the range of an angle of approximately 120°. That is, from a state in which the light-emitting portion 4 is approximately perpendicular to the main body 2 and protrudes forward (see FIG. 9A) to a state in which the light-emitting portion 4 is turned backward by approximately 30° from the upright position to be tilted toward the rear side (see FIG. 9F). Between those states, the light-emitting portion 4 has been turned upward by approximately 90° to stand virtually upright and face upward with respect to the main body 2 (see FIG. 9D) Within this range, the light-emitting portion 4 can be fixed to the main body 2 in an arbitrary position.

According to the flash apparatus 1 having the above-described structure, since the main body 2 is capable of turning in a vertical direction (anteroposterior direction), and the light-emitting portion 4 is capable of turning in a horizontal direction and a vertical direction (anteroposterior direction) with respect to the main body 2, the light-emitting surface of the light-emitting portion 4 can roughly be moved spherically in the form of a hemisphere. As a result, for example, it is possible to cause the light-emitting surface to face forward with the light-emitting portion 4 being displaced forward (see FIGS. 8 and 10C), and to cause the light-emitting surface to face diagonally downward (see FIG. 10A). Further, by turning the light-emitting portion 4 in a horizontal direction with respect to the upper surface of the main body 2 from the state shown in FIG. 10A, the light-emitting surface can be caused to face the side thereof with the light-emitting portion 4 being tilted, as shown in FIG. 11.

In the present embodiment, the reflecting-mirror drive unit 36 is used as an irradiation-range modifier, and the reflecting mirror 34 is moved close to and away from the xenon tube 33. However, the irradiation-range modifier of a flash apparatus according to an embodiment of the present invention is not limited thereto. For example, a reflecting mirror may be fixed, allowing the xenon tube 33 to move close to and away from the reflecting mirror, and, further both the xenon tube 33 and the reflecting mirror 34 may be relatively moved.

Also, in the present embodiment, regarding the turn of the main body 2 in a vertical direction, the main body 2 is capable of turning within the range of an angle of approximately 30° from a state in which the main body 2 stands virtually upright and faces upward with respect to the attachment portion 3 to a state in which the main body 2 is tilted toward the front side and faces diagonally upward. Further, regarding the turn of the light-emitting portion 4 in a vertical direction, the light-emitting portion 4 is capable of turning within the range of an angle of approximately 120°, from a state in which the light-emitting portion 4 is approximately perpendicular to the main body 2 and protrudes forward to a state in which the light-emitting portion 4 is tilted toward the rear side. However, the turn of the main body 2 and the light-emitting portion 4 is not limited to the above. The angles tilted may be set to, for example, 45°, 90° or other desired angles. In addition, the main body 2 can be turned to the rear side and not necessarily turned to the front side.

FIG. 12 shows an electronic still camera 51 according to a first embodiment of an imaging apparatus of the present invention, to which the flash apparatus 1 with the aforementioned structure has been attached. The electronic still camera 51 includes a camera body 52 that is a specific example of an imaging apparatus body.

The camera body 52 includes a camera case 53 formed of a rectangular casing with a space provided inside. In the space of the camera case 53, a wiring substrate with various electronic parts mounted thereon, a battery power source, a storage device, various other electronic and mechanical parts, devices and the like, although not shown in the figure, are stored. A lens device 55 is arranged approximately at the center of the front of the camera case 53. A conversion lens 56 for the function of telephotography, wide angle and the like is attached to the end of the lens device 55 in a freely detachable manner. Further, a CCD (solid-state imaging device) that is a specific example of an imager is arranged behind an optical axis of the lens device 55.

On the top surface of the camera case 53, a flash apparatus 58 integrally provided on the camera case 53 is provided. When flash photography is carried out, the flash apparatus 58 is raised to expose a flash-light emitting portion (not shown in the figure). Further, on the camera case 53 are provided a power button, a menu button, a liquid crystal display (LCD) that is a specific example of a display device, an electronic viewfinder and the like, although not shown in the figure.

Further, on the right side part (in FIG. 12, the left side when seeing the electronic still camera 51 from the front) at the front of the camera case 53, a grip portion 53a for gripping the camera case 53, is provided. Since the whole of the grip portion 53a of the camera case 53 protrudes forward, it is easy to grip with one hand. On the top surface of the grip portion 53a, a shutter button 59 with which to photograph a subject, and an accessory shoe (not shown in the figure), which is a specific example of an attachment target portion, having a connecting terminal of a flash connecting circuit, are arranged. The flash apparatus 1 is attached to the accessory shoe in a freely detachable manner. In this regard, the connecting terminal 25 provided on the fixing board 24 of the flash apparatus 1 is brought to contact with the connecting terminal of the accessory shoe of the electronic still camera 51, and thus an electric circuit of the flash apparatus 1 and an electric circuit of the electronic still camera 51 are electrically connected to each other.

FIGS. 13A and 13B show examples of states in which flash photography is carried out using the electronic still camera 51 with the above-described flash apparatus 1 being installed. FIG. 13A shows a state in which photography is carried out without the conversion lens 56 attached to the electronic still camera 51. In this regard, with respect to the posture of the flash apparatus 1, the main body 2 is made approximately perpendicular to the upper surface of the electronic still camera 51 and the light-emitting portion 4 is made parallel to an optical axis of the lens device of the electronic still camera 51 (the posture shown in FIG. 9A). Thus, a subject X is irradiated with light emitted from the light-emitting portion 4 of the flash apparatus 1, as shown by the beam L1, so that a desired irradiation range (the upper body of the subject X) can surely be irradiated with light, and therefore an excellent image can be photographed.

FIG. 13B shows a state in which photography is carried out with the conversion lens 56 attached to the electronic still camera 51. In this regard, if the posture of the flash apparatus 1 is the same as the that of FIG. 13A shown by the broken lines, the subject X is irradiated with light emitted from the light-emitting portion 4, as shown by the beam L1'. Hence, a part Y in the desired irradiation range (the upper body of the subject X) may not be irradiated with light, and therefore an eclipse is caused in a photographed image. Therefore, the main body 2 of the flash apparatus 1 is turned to tilt toward the subject X and the light-emitting portion 4 is turned to become parallel to the optical axis of the lens device 55 of the electronic still camera 51. Accordingly, the posture of the flash apparatus 1 is shifted such that the light-emitting portion 4 becomes close to the subject as shown by the solid lines (posture shown in FIG. 10C). Thus, the subject X is irradiated with light emitted from the light-emitting portion 4, as shown by the beam L2, so that the desired irradiation range (the upper body of the subject X) can surely be irradiated with light, and therefore an excellent image can be photographed.

FIG. 14 is a block diagram showing a first embodiment of a schematic configuration of a flash apparatus 1 having the aforementioned structure and function and an electronic still camera 51 to which the flash apparatus 1 is attached.

The flash apparatus 1 includes in a light-emitting portion 4 a xenon tube 33 that is a light emitter and a reflecting mirror 34, a reflecting-mirror drive unit 36 that is a specific example of an irradiation-range modifier which moves the reflecting mirror 34 in the direction of getting close to or away from the xenon tube 33 and the like. Further, the flash apparatus 1 includes in a main body 2 an angle detector 37, which is a specific example of an inclination detector, detecting the inclination of the main body 2 to output a detection signal thereof, and the like. A gyro sensor, for example, can be used for the angle detector 37, detecting the tilted angle of the main body 2 based on, for example, the inclination thereof with respect to the direction of gravity. A connecting terminal 25 provided on an attachment portion 3 of the flash apparatus 1 is connected to the reflecting-mirror drive unit 36 and the angle detector 37.

The electronic still camera 51 includes a lens device 55 which has a zoom lens 61, an image recording/reproducing circuit unit 70 which plays a central role in a control device and a built-in memory 71 which has a program memory to drive the image recording/reproducing circuit unit 70, a data memory, other RAM, ROM and the like. The electronic still camera 51 further includes an image signal processing unit 72 which processes a photographed image or the like into a predetermined signal and a display device 73 which displays a photographed image and the like. The electronic still camera 51 still further includes an external memory 74 used to enlarge storage capacity and a control unit 75 that is a specific example of an irradiation-range calculator which controls the drive of a zoom lens and which outputs a control signal that adjusts the irradiation range of light emitted toward a subject and the like.

The image recording/reproducing circuit unit 70 includes an arithmetic circuit which has a microcomputer (CPU) and the like, for example. To the image recording/reproducing circuit unit 70, the built-in memory 71, the image signal processing unit 72, the control unit 75, a monitor drive unit 78 and two interfaces (I/F) 81 and 82, are connected. The image signal processing unit 72 is connected to a CCD 76 that is a specific example of an imager attached to the lens device 55 through an amplifier 77, and a signal processed into a predetermined image signal is input to the image recording/reproducing circuit unit 70.

The display device 73 is connected to the image recording/reproducing circuit unit 70 through the monitor drive unit 78. Further, a connector 85 is connected to the first interface (I/F) 81. The external memory 74 can be connected to the connector 85 in a freely detachable manner. A connecting terminal 86 provided on a camera body 52 is connected to the second interface (I/F) 82.

To the control unit 75 are connected an operational unit 87 including a shutter button 59, a menu button and the like, a zoom drive unit 88 that drives and controls the zoom lens 61, and a position-detecting sensor 89 which is a specific example of a distance detector which detects the position of the zoom lens 61 and the distance to a subject. Further, a connecting terminal 90 is connected to the control unit 75 via a third interface (I/F) 83, and the connecting terminal 25 of the flash apparatus 1 is capable of being connected to the connecting terminal 90 in a freely detachable manner.

Thus, when an image of a subject has been input to a lens system of the lens device 55 to be formed on the focusing screen of the CCD 76, an image signal thereof is input to the image signal processing unit 72 via the amplifier 77. A signal processed into a predetermined image signal in the image signal processing unit 72 is input to the image recording/reproducing circuit unit 70. Thus, a signal corresponding to an image of a subject is output from the image recording/reproducing circuit unit 70 to the monitor drive unit 78, the built-in memory 71 or the external memory 74. As a result, an image corresponding to an image of a subject is displayed on the display device 73 via the monitor drive unit 78, or, if necessary, it is recorded as an information signal in the built-in memory 71 or in the external memory 74.

In the above-described state of photography, when the main body 2 of the flash apparatus 1 is turned forward with the light-emitting portion 4 of the flash apparatus 1 approximately parallel to an optical axis of the lens device 55, the angle detector 37 detects the inclination of the main body 2. Then, the angle detector 37 outputs a detection signal to the control unit 75 via the connecting terminal 90 and the third interface (I/F) 83. Further, the position-detecting sensor 89 detects the distance to a subject and outputs a detection signal to the control unit 75. On receiving these detection signals, the control unit 75 carries out predetermined arithmetic processing and outputs a control signal, which controls the irradiation range of light emitted toward a subject, to the reflecting-mirror drive unit 36 in the light-emitting portion 4 via the third interface (I/F) 83, the connecting terminal 90 of the electronic still camera 51 and the connecting terminal 25 of the flash apparatus 1. Based on a control signal from the control unit 75, the reflecting-mirror drive unit 36 moves the reflecting mirror 34 in the direction of getting close to or away from the xenon tube 33 by a predetermined amount, modifying the emission angle of light emitted from the light emitter. Thus, the irradiation range of light emitted from the light-emitting portion 4 of the flash apparatus 1 toward a subject can be adjusted to be suitable, and an excellent image can be obtained by surely applying light at a desired view angle.

FIG. 15 shows a stand 101 that is a specific example of a supporting stand with which the above-described flash apparatus 1 can be mounted on a mounting surface. This stand 101 is formed of a roughly square board, and on the upper surface thereof an accessory shoe 102 to which the attachment portion 3 of the flash apparatus 1 can be attached in a freely detachable manner is provided. The accessory shoe 102 is arranged approximately at the center portion of one side of the stand 101, including a storage portion 102a roughly square-shaped, an upper surface piece 102b opposed to the bottom surface of the storage portion 102a and continuous with the upper surface of the stand 101, and the like. Into the storage portion 102a of the accessory shoe 102, the fixing board 24 provided on the attachment portion 3 of the flash apparatus 1 is inserted, and the upper surface piece 102b is held by the fastening ring 23 and the fixing board 24 of the flash apparatus 1, enabling the stand 101 to be attached to the flash apparatus 1.

Note that, in the case of the stand 101 being attached to the flash apparatus 1 and thus used, the function mode of the flash apparatus 1 is set to the slave mode. This makes it possible to carry out flash photography in which, for example, light is emitted a flash apparatus integrally provided in a camera body and from the flash apparatus 1 at the same time. Specifically, a light sensor not shown in the figures is provided on the attachment member 21 of the attachment portion 3 of the flash apparatus 1. The light sensor detects light emitted from the flash apparatus of the camera body, causing light corresponding to the amount of detected light to be emitted from the light-emitting portion 4 of the flash apparatus 1.

By attaching the above-described stand 101 to the flash apparatus 1, the flash apparatus 1 can be mounted on the mounting surface, enabling flash photography to be carried out in which the angle of light directly or indirectly applied to a subject and the distance from the flash apparatus 1 to the subject can be set arbitrarily. For example, when the posture of the flash apparatus 1 is made to be the one shown in FIG. 16 in which the light-emitting surface of the light-emitting portion 4 faces diagonally downward, such photography that bounces light coming from below that is applied to a subject can be carried out with ease.

As described above, according to an embodiment of a flash apparatus of the present invention, when flash photography is carried out with the flash apparatus being attached to an imaging apparatus whose lens device greatly protrudes toward a subject, a main body is turned to be tilted toward the subject and a light-emitting portion is shifted to the vicinity of the lens device. Therefore, there is no possibility that part of the light emitted from the light-emitting portion is obstructed by the lens device, and an eclipse can be prevented from occurring in a photographed image.

Further, according to an embodiment of an imaging apparatus of the present invention, a control signal which adjusts the irradiation range of light emitted from a light-emitting portion of a flash apparatus is output from an irradiation-range calculator based on detection signals output from an inclination detector of the flash apparatus and a distance detector. Therefore, on receiving the control signal, the flash apparatus is capable of applying light surely to a desired irradiation range by relatively moving a xenon tube or a reflecting mirror, thus enabling an excellent image to be obtained.

The present invention is not limited to the embodiments described above and shown in the figures, and various modifications are possible without deviating from the gist of the present invention. For example, although an electronic still camera is used as an imaging apparatus in the aforementioned embodiments, the present invention can also be applied to still cameras, video cameras and other imaging apparatuses.

It should be understood by those skilled in the art that various modifications, combinations, sub-combinations and modifications may occur depending on design requirements and other factors insofar as they are within the scope of the appended claims or the equivalents thereof.

What is claimed is:

1. A flash apparatus comprising:
    an attachment portion capable of being attached in a freely detachable manner to an attachment target portion provided on an imaging apparatus;
    a main body supported in a turnable manner in an anteroposterior direction with respect to said attachment portion by means of a first turning portion; and
    a light-emitting portion supported in a turnable manner in an anteroposterior or vertical direction with respect to said main body by means of a second turning portion, including a light emitter directly or indirectly emitting light to a subject.

2. The flash apparatus according to claim 1, wherein said attachment target portion is an accessory shoe having a connecting terminal of a flash connecting circuit of said imaging apparatus, said attachment portion being provided with a connecting terminal connected to said light emitter and connected in a detachable manner to said connecting terminal of said accessory shoe.

3. The flash apparatus according to claim 1, further comprising:
    an inclination detector detecting the inclination of said main body and outputting a detection signal thereof; and
    an irradiation-range modifier capable of modifying the irradiation range of light, with which a subject is irradiated, by relatively moving a xenon tube or a reflecting mirror based on a control signal supplied from said imaging apparatus.

4. An imaging apparatus comprising:
    a lens device through which light reflected from a subject is passed;
    an imager picking up a subject image input from said lens device and outputting an image signal thereof;
    a flash apparatus directly or indirectly emitting light to said subject; and
    an attachment target portion to which said flash apparatus is attached in a detachable manner;
    wherein said flash apparatus includes an attachment portion capable of being attached in a freely detachable manner to said attachment target portion, a main body supported in a turnable manner in an anteroposterior direction with respect to said attachment portion by means of a first turning portion, and a light-emitting portion supported in a turnable manner in an anteroposterior or vertical direction with respect to said main body by means of a second turning portion, including a light emitter facing a subject.

5. The imaging apparatus according to claim 4, further comprising:
    a distance detector detecting the distance to said subject and outputting a detection signal thereof;
    an inclination detector detecting the inclination of said main body and outputting a detection signal thereof;
    an irradiation-range calculator outputting a control signal for controlling the light-emitting portion such that the irradiation range of light emitted from said light emitter toward said subject becomes suitable, based on detection signals from said distance detector and from said inclination detector; and
    an irradiation-range modifier capable of modifying the irradiation range of light, with which a subject is irradiated, by relatively moving a xenon tube or a reflecting mirror based on a control signal supplied from said irradiation-range calculator.

* * * * *